US012766956B2

(12) United States Patent
Sampath

(10) Patent No.: US 12,766,956 B2
(45) Date of Patent: Oct. 20, 2026

(54) METHOD AND SYSTEM OF PILOT AUGMENTATION OF TRANSCRIBED AUDIO MESSAGES

(71) Applicant: HONEYWELL INTERNATIONAL INC., Charlotte, NC (US)

(72) Inventor: Mahesh Kumar Sampath, Madurai (IN)

(73) Assignee: HONEYWELL AEROSPACE US LLC, Phoenix, AZ (US)

(*) Notice: Subject to any disclaimer, the term of this patent is extended or adjusted under 35 U.S.C. 154(b) by 65 days.

(21) Appl. No.: 18/828,509

(22) Filed: Sep. 9, 2024

(65) Prior Publication Data

US 2026/0027897 A1 Jan. 29, 2026

(30) Foreign Application Priority Data

Jul. 24, 2024 (IN) ............................. 202411056309

(51) Int. Cl.

| | |
|---|---|
| ***B60K 35/22*** | (2024.01) |
| ***G06F 3/02*** | (2006.01) |
| ***G06F 3/04886*** | (2022.01) |
| ***G06F 40/109*** | (2020.01) |
| ***G06F 40/174*** | (2020.01) |
| ***G10L 15/26*** | (2006.01) |

(52) U.S. Cl.

CPC ................ *B60K 35/22* (2024.01); *G06F 3/02* (2013.01); *G06F 3/04886* (2013.01); *G06F 40/109* (2020.01); *G06F 40/174* (2020.01); *G10L 15/26* (2013.01)

(58) Field of Classification Search

CPC ....... B60K 35/22; G06F 3/02; G06F 3/04886; G06F 40/109; G06F 40/174; G10L 15/26

See application file for complete search history.

(56) References Cited

U.S. PATENT DOCUMENTS

| | | | |
|---|---|---|---|
| 9,262,927 | B2 | 2/2016 | Populus et al. |
| 9,666,178 | B2 | 5/2017 | Loubiere et al. |
| 10,672,279 | B2 | 6/2020 | Shamasundar et al. |
| 11,908,330 | B2 | 2/2024 | Shamasundar |
| 12,020,578 | B2 | 6/2024 | Kanagarajan et al. |

(Continued)

FOREIGN PATENT DOCUMENTS

| | | | |
|---|---|---|---|
| EP | 4152294 | A1 | 3/2023 |
| EP | 4210021 | A1 | 7/2023 |

*Primary Examiner* — Aniss Chad
*Assistant Examiner* — Christine Nguyen Huynh
(74) *Attorney, Agent, or Firm* — Ingrassia, Fisher & Lorenz LLP

(57) ABSTRACT

A method comprises receiving at least one audio message providing instructions to a user on an aircraft, and displaying, on a graphical user interface (GUI) of a display device on the aircraft, at least one transcription of the at least one audio message on a transcription page provided to display transcriptions of multiple audio messages in a predetermined order. The method also displays, by at least one processor, at least one parameter field on the transcription page and associated with the instructions. The at least one parameter field has an indicator feature that indicates the at least one parameter field is modifiable by a user directly on the transcription page. Then the method includes displaying, by at least one processor, an input parameter entered by the user and displayed on the parameter field.

20 Claims, 8 Drawing Sheets

(56) References Cited

U.S. PATENT DOCUMENTS

| | | | | |
|---|---|---|---|---|
| 2018/0150280 | A1* | 5/2018 | Rhee | G06F 9/451 |
| 2019/0066674 | A1* | 2/2019 | Jaygarl | G10L 15/22 |
| 2023/0026834 | A1 | 1/2023 | Desai et al. | |
| 2023/0062208 | A1 | 3/2023 | Saptharishi et al. | |
| 2023/0091597 | A1* | 3/2023 | Shamasundar | G06F 3/14<br>340/963 |
| 2023/0215431 | A1* | 7/2023 | Baladhandapani | G08G 5/21 |

* cited by examiner

METHOD AND SYSTEM OF PILOT AUGMENTATION OF TRANSCRIBED AUDIO MESSAGES

CROSS REFERENCE TO RELATED APPLICATION

This application claims priority to India Provisional Patent Application No. 202411056309, filed Jul. 24, 2024, the entire content of which is incorporated by reference herein.

TECHNICAL FIELD

The subject matter described herein relates generally to vehicle systems, and more particularly, implementations of the subject matter relate to transcribed audio messages on vehicles.

BACKGROUND

Modern flight deck displays (or cockpit displays) provide several different displays from which a pilot or other user can obtain information or perform functions related to, for example, flight planning, flight guidance, navigation, and performance management. Modern displays also allow a pilot to input commands or other information to onboard systems, such as navigational clearances or commands issued by an air traffic controller (ATC). For example, air traffic control involves voice communications between air traffic control and a pilot or crewmember onboard the various aircrafts within a controlled airspace, where the ATC may communicate an instruction or a request for pilot action by a particular aircraft using a call sign assigned to that aircraft. The instruction may provide a particular navigation related value, such as altitude, speed, or flight plan location such as a waypoint, or may indicate the pilot has discretion to select a flight-related parameter value. However, the entry of the parameters on displays in a cockpit can be complicated when multiple displays are involved, which is increased when a transcription of the ATC communications are on a separate page as well. Thus, the pilot may look at the transcription page to confirm instructions or commands from the ATC, while viewing another display or interface to enter the relevant values, and yet another display to confirm entry of the values, and so on. Hence, it is desirable to provide aircraft systems and methods that facilitate updating and/or adding flight parameter values relevant to transcribed audio communications in a more convenient and efficient manner that reduces pilot workload and increases pilot situational awareness.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one example implementation, a method includes receiving at least one audio message providing instructions to a user on an aircraft, and displaying, on a graphical user interface (GUI) of a display device on the aircraft, at least one transcription of the at least one audio message on a transcription page provided to display transcriptions of multiple audio messages in a predetermined order. The method also includes displaying, by at least one processor, at least one parameter field on the transcription page and associated with the instructions. The at least one parameter field has an indicator feature that indicates the at least one parameter field is modifiable by a user directly on the transcription page. The method also includes displaying, by at least one processor, an input parameter entered by the user on the transcription page and displayed on the parameter field.

In another example implementation, an aircraft includes memory storing data related to flight of the aircraft, and processor circuitry forming at least one processor communicatively coupled to the memory. The processor is arranged to operate by: receiving at least one audio message providing instructions to a user on the aircraft, displaying, on a graphical user interface of a display device on the aircraft, at least one transcription of the at least one audio message on a transcription page provided to display transcriptions of multiple audio messages in a predetermined order, and displaying at least one parameter field on the transcription page and associated with the instructions. The at least one parameter field has an indicator feature that indicates the at least one parameter field is modifiable by a user directly on the transcription page. The processor is arranged to operate by displaying an input parameter entered by the user and displayed on the parameter field.

In yet another example implementation, a non-transitory computer-readable medium has computer-executable instructions stored thereon that, when executed by a computing device, cause the computing device to operate by: receiving at least one audio message providing instructions to a user on an aircraft, displaying, on a graphical user interface of a display device on the aircraft, at least one transcription of the at least one audio message on a transcription page provided to display transcriptions of multiple audio messages in a predetermined order, and displaying at least one parameter field on the transcription page and associated with the instructions. The at least one parameter field has an indicator feature that indicates the at least one parameter field is modifiable by a user directly on the transcription page. The instructions also cause the computing device to operate by displaying an input parameter entered by the user and displayed on the parameter field.

Furthermore, other desirable features and characteristics of the system and method for pilot augmentation of transcribed audio messages as described herein will become apparent from the subsequent detailed description and the appended claims, taken in conjunction with the accompanying drawings and the preceding background.

BRIEF DESCRIPTION OF THE DRAWINGS

Implementations of the subject matter will hereinafter be described in conjunction with the following drawing figures, wherein like numerals denote like elements, and.

DETAILED DESCRIPTION

Figure 1:
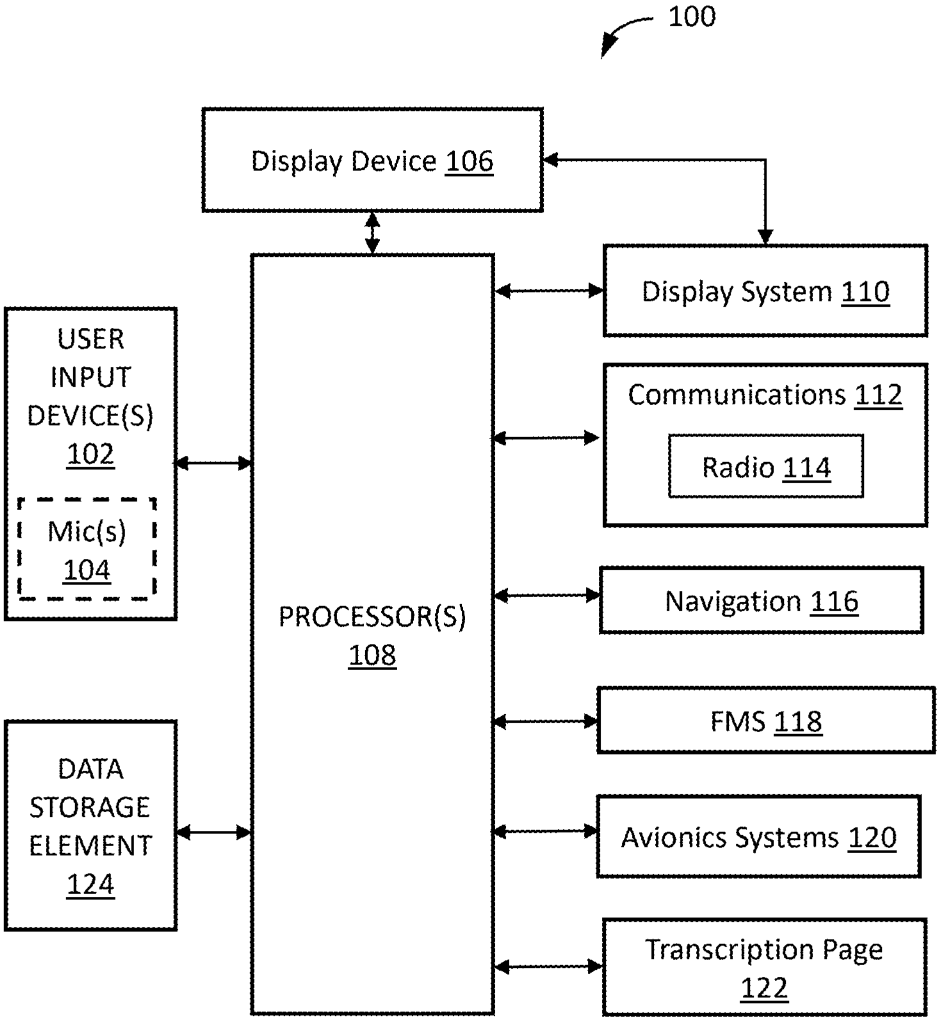
FIG. 1 is a schematic diagram of an example aircraft system according to at least one of the implementations herein.

The following detailed description includes example implementations that are not intended to limit the subject matter of the application and uses thereof. Furthermore, there is no intention to be bound by any theory presented in the preceding background, brief summary, or the following detailed description.

Implementations of the subject matter described herein generally relate to systems and methods that facilitate a vehicle operator providing an audio input to one or more displays or onboard systems using automatic speech recognition (ASR). For purposes of explanation, the subject matter is primarily described herein in the context of aircraft operating in a controlled airspace; however, the subject matter described herein is not necessarily limited to aircraft or avionic environments, and in alternative implementations, may be implemented in an equivalent manner for ground operations, marine operations, or otherwise in the context of other types of vehicles and travel spaces.

As described in greater detail below, an audio message with an input voice command is transcribed into a transcription message (or just transcription) that is displayed on a transcription page on a graphical user interface (GUI) of a display device accessible to an aircrew of an aircraft. The terms aircrew, crew, pilot, co-pilot, driver, user, and so forth, whether singular or plural, are used interchangeably herein. The transcription page is reserved for transcribed radio messages, often in a conversation back and forth between the pilot on an aircraft and an external entity, such as an air traffic control (ATC) and particularly for ATC clearance as one of many examples. The ATC often transmits audio messages over radio to issue commands, instructions, and/or announcements for the aircrew. This permits the pilot to review the conversation after the audio messages have been received and transmitted back to track the various requests and answers. The input voice commands (or transcribed messages or just transcriptions) are parsed and analyzed to automatically identify an operational subject or entity directly or indirectly related to a flight or flight plan of the aircraft and that is specified within the voice command. The operational subject or entity is then used to automatically identify one or more parameters related to the operational subject or entity (referred to herein as being associated with the transcribed message). For example, natural language processing, machine learning, and/or neural network based techniques may be applied to a voice command (which is also in the form of a transcription or textual representation thereof) to determine one or more parameters associated with the transcribed message such as a runway, a taxiway, a waypoint, a heading, a speed, an altitude, a flight level, a communications radio or another avionics system or setting, an aircraft action (e.g., landing, takeoff, pushback, hold, or the like) and any other parameter that is associated with a flight of the aircraft receiving the messages.

The association of a parameter to a transcribed message may be determined in a number of different ways. First, the parameter may have been stated in the transcribed message itself. Second, one or more avionics systems on an aircraft such as a flight management system (FMS) used to operate the aircraft may have generated or previously received the parameter. Third, the transcribed message may indicate a specific type of parameter is to be determined by the aircrew or pilot. Often in this case, an ATC may mention the parameter is at the discretion of the pilot or similar language. Once the association of the parameter to a transcribed message is determined, the parameter is tagged to that message (or messages).

In order provide the pilot with more flight data directly on the transcription screen or page, and after identifying a parameter associated with a transcribed message, the transcription page can be automatically augmented by adding a parameter field on the transcription page and with an indicator feature that indicates the parameter on the transcription page can be changed by the pilot. This may include placing a box or window around a parameter either where the location of the parameter in the transcribed message or a separate box or window around the parameter. Otherwise, when a pilot has a discretion, an empty parameter field such as an empty window may be opened on the transcription page to receive an entry of parameter value from the pilot. Herein, an empty parameter field refers to an empty image space that is empty of a parameter value or text that forms the parameter. The parameter field still may have symbols or text related to a parameter that is not the parameter itself, such as instructions to enter a parameter (for example, "place altitude here").

The parameter field also may have an association between the parameter field and the transcription displayed on the transcription page to show the pilot which transcription a parameter and parameter field is associated with. This may simply be the location of the parameter field on the transcription page and relative to a border showing the transcribed message. The pilot is able to enter updates or original parameters directly into the parameter fields on the transcription page, such as by touch screen entries, mouse, and/or keyboard as well as by a pilot's audio message, as explained below thereby receiving pilot augmentations of the transcriptions. The parameters can then be confirmed by the pilot and provided to the appropriate avionic system for further action, such as flight planning.

With this arrangement of both automatic and manual augmentation of the transcription page by completely or partially onboard systems, pilots will have significantly increased situational awareness to be able to handle flight planning much more efficiently. By being able to see a sequence of discretionary parameters being entered on transcription page along with corresponding transcribed messages, it will be easier for a pilot to keep such sequence organized and readily available for recall to generate customized complex flight plans such as for ATC clearances and optimized fuel-efficient flight plans to name a few examples. By one form, the transcription page intentionally maintains the full or relevant continuous parts of the transcription messages rather than only extracting relevant parameters or information to separate display pages as a further tool to assist the pilot with recalling context regarding a particular parameter on the transcription page.

Referring to FIG. 1, an example system 100 may be used by a vehicle, such as an aircraft. In an example implementation, the system 100 is at least partially on an aircraft and includes, without limitation, one or more user input devices 102 that may have one or more microphones 104, a display device 106, one or more processors 108, a display system 110, a communications system 112 with a radio 114, a navigation system 116, a flight management system (FMS) 118, one or more other avionics systems 120, a transcription page unit 122, and a data storage element 124.

In example implementations, the display device 106 is an electronic display capable of graphically displaying flight information or other data associated with operation of the aircraft under control of the display system 110 and/or processor 108. In this example, the display device 106 is coupled to the display system 110 and the processor 108, and the processor 108 and the display system 106 are cooperatively configured to display, render, or otherwise convey one or more graphical representations or images associated with operation of the aircraft on the display device 106, and particularly at least a transcription page that shows at least one or a sequence of transcribed audio messages, whether only those messages received by one example, but also can show outgoing messages as well. The user input device 102 is coupled to the processor(s) 108 and may or may not be considered entirely or partially part of display device 106. The user input device 102 and the processor 108 are cooperatively configured to allow a user (e.g., a pilot) to interact with the display device 106 and/or other elements of the system 100, as described in greater detail below. By one form, the display device 106 is or has a graphical user interface, and may include or be communicatively coupled to, the user input device 102. Depending on the implementation, the user input device(s) 102 may be a keypad or keyboard (whether physical or virtual), touchpad, mouse, touch panel (or touchscreen), joystick, knob, line select key and/or another suitable device adapted to receive input from a user. In some example implementations, the user input device 102 includes an audio input device, such as the microphone 104, audio transducer, audio sensor, or the like, that is adapted to allow a user to provide audio input to the system 100 in a "hands free" manner using speech recognition.

The processor 108 is at least one processor formed by processor circuitry and includes the hardware, software, and/or firmware components configured to operate any of the units described herein, to facilitate communications and/or interaction between the elements of the system 100, and to perform additional tasks and/or functions to support operation of the system 100, as described in greater detail below. Depending on the implementation, the processor 108 may be a general purpose processor such as a central processing unit (CPU), a content addressable memory, a digital signal processor, an application specific integrated circuit, a field programmable gate array, any suitable programmable logic device, discrete gate or transistor logic, processing core(s), discrete hardware components, or any combination thereof, designed to perform the functions described herein. The processor 108 may also be implemented as a combination of computing devices, e.g., a plurality of processing cores, a combination of a digital signal processor and a microprocessor, a plurality of microprocessors, one or more microprocessors in conjunction with a digital signal processor core, a System on a Chip (SoC), or any other such configuration or combination. In practice, the processor 108 includes processing logic that may be configured to perform the functions, techniques, and processing tasks associated with the operation of the system 100, as described in greater detail below. Furthermore, the steps of a method or algorithm described in connection with the implementations disclosed herein may be embodied directly in hardware, in firmware, in a software module (or unit) executed by the processor 108, or in any practical combination thereof. For example, in one or more implementations, the processor 108 includes or otherwise accesses a data storage element (or memory), which may be realized as any sort of non-transitory short or long term storage media capable of storing programming instructions for execution by the processor 108. The code or other computer-executable programming instructions, when read and executed by the processor 108 (or computing device), cause the processor 108 to support or otherwise perform certain tasks, operations, functions, and/or processes described herein.

The display system 110 is the hardware, software, and/or firmware components configured to control the display and/or rendering of the transcription page described herein, one or more navigational maps, and/or other displays pertaining to operation of the aircraft and/or onboard systems 112, 114, 116, 118, 120, and 122 on the display device 106. In this regard, the display system 110 may access or include one or more databases suitably configured to support operations of the display system 110, such as, for example, a terrain database, an obstacle database, a navigational database, a geopolitical database, a terminal airspace database, a special use airspace database, or other information for rendering and/or displaying navigational maps and/or other content on the display device 106.

In the illustrated implementation, the aircraft system 100 includes a data storage element 124, which contains aircraft procedure information (or instrument procedure information) for a plurality of airports and maintains association between the aircraft procedure information and the corresponding airports. In example implementations, the data storage element 124 maintains associations between prescribed operating parameters, constraints, and the like and respective navigational reference points (e.g., waypoints, positional fixes, radio ground stations (VORs, VORTACs, TACANs, and the like), distance measuring equipment, non-directional beacons, or the like) defining the aircraft procedure, such as, for example, altitude minima or maxima, minimum and/or maximum speed constraints, RTA constraints, and the like. Depending on the implementation, the data storage element 124 may be physically realized using RAM memory, ROM memory, flash memory, cache, registers, a hard disk, or another suitable data storage medium known in the art or any suitable combination thereof.

In the present example, the processor 108 is coupled to the navigation system 116, which is configured to provide real-time navigational data and/or information regarding operation of the aircraft. The navigation system 116 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 116, as will be appreciated in the art. The navigation system 116 is capable of obtaining and/or determining the instantaneous position of the aircraft, that is, the current (or instantaneous) location of the aircraft (e.g., the current latitude and longitude) and the current (or instantaneous) altitude or above ground level for the aircraft. The navigation system 116 is also capable of obtaining or otherwise determining the heading of the aircraft. In the illustrated implementation, the processor 108 is also coupled to the communications system 112, which is configured to support communications to and/or from the aircraft. For example, the communications system 112 may support communications between the aircraft and air traffic control or another suitable command center or ground location. Thus, the communications system 112 may be realized using a radio communication system or device (or unit) 114 and/or another suitable data link system. The communications system(s) 112 is, has, or communicates with the avionics systems 116, 118, 120, 122 capable of receiving clearance or other types of communications from other external sources, such as, for example, other aircraft, an air traffic controller, or the like. Depending on the implementation, the communications system(s) 112 may include one or more of a very high frequency (VHF) radio communications system, a controller-pilot data link communications (CPDLC) system, an acronautical operational control (AOC) communications system, an aircraft communications addressing and reporting system (ACARS), and/or the like.

In example implementations, the processor 108 is also coupled to the FMS 118, which is coupled to the navigation system 116, the communications system 112, the transcription page unit 122, and one or more additional avionics systems 120 to support navigation, flight planning, and other aircraft control functions, as well as to provide real-time data and/or information regarding the operational status of the aircraft to the processor 108. The system 100 and/or aircraft may include numerous avionics systems for obtaining and/or providing real-time flight-related information that may be displayed on the display device 106 or otherwise provided to a user (e.g., a pilot). For example, practical implementations of the system 100 and/or aircraft will likely include one or more of the following avionics systems suitably configured to support operation of the aircraft: a weather system, an air traffic management system, a radar system, a traffic avoidance system, an autopilot system, an auto-thrust system, a flight control system, hydraulics systems, pneumatics systems, environmental systems, electrical systems, engine systems, trim systems, lighting systems, crew alerting systems, electronic checklist systems, an electronic flight bag (EFB) and/or another suitable avionics system.

The system 100 also may have a transcription page unit 122 to manage the display of transcriptions and parameters while receiving updates and entries of parameters from pilots and on the transcription page. The transcription page unit 122 may be operated by processor 108 and may be communicatively coupled to the other units of system 100 as desired. The details of the transcription page unit 122 are provided on FIG. 2.

It should be understood that FIG. 1 is a simplified representation of the system 100 for purposes of explanation and case of description, and FIG. 1 is not intended to limit the application or scope of the subject matter described herein in any way. It should be appreciated that any of the systems, units, and devices of system 100 may be entirely onboard the aircraft or partially onboard and remote from the aircraft. By one form, at least the display device 106 is entirely onboard. Those parts of systems, modules, and units of system 100 external to the aircraft may be communicatively coupled to the remaining elements or parts of the system 100 on the aircraft (e.g., via a data link and/or communications system 112). Similarly, in some implementations, the data storage element 124 may be located external to the aircraft and communicatively coupled to the processor 108 via a data link and/or communications system 112. Furthermore, practical implementations of the system 100 and/or aircraft will include numerous other devices and components for providing additional functions and features, as will be appreciated in the art. In this regard, it will be appreciated that although FIG. 1 shows a single display device 106, in practice, additional display devices may be present onboard the aircraft. Additionally, it should be noted that in other implementations, features and/or functionality of processor 108 described herein can be implemented by or otherwise integrated with the features and/or functionality provided by the FMS 118. In other words, some implementations may integrate the processor 108 with the FMS 118. In yet other implementations, various aspects of the subject matter described herein may be implemented by or at an electronic flight bag (EFB) or similar mobile electronic device that is communicatively coupled to the processor 108 and/or the FMS 118 (or has the processor 108). Thus, the display device 106 may be a mobile device that displays a transcription page as described herein at least while the display device 106 is aboard the aircraft.

Figure 2:
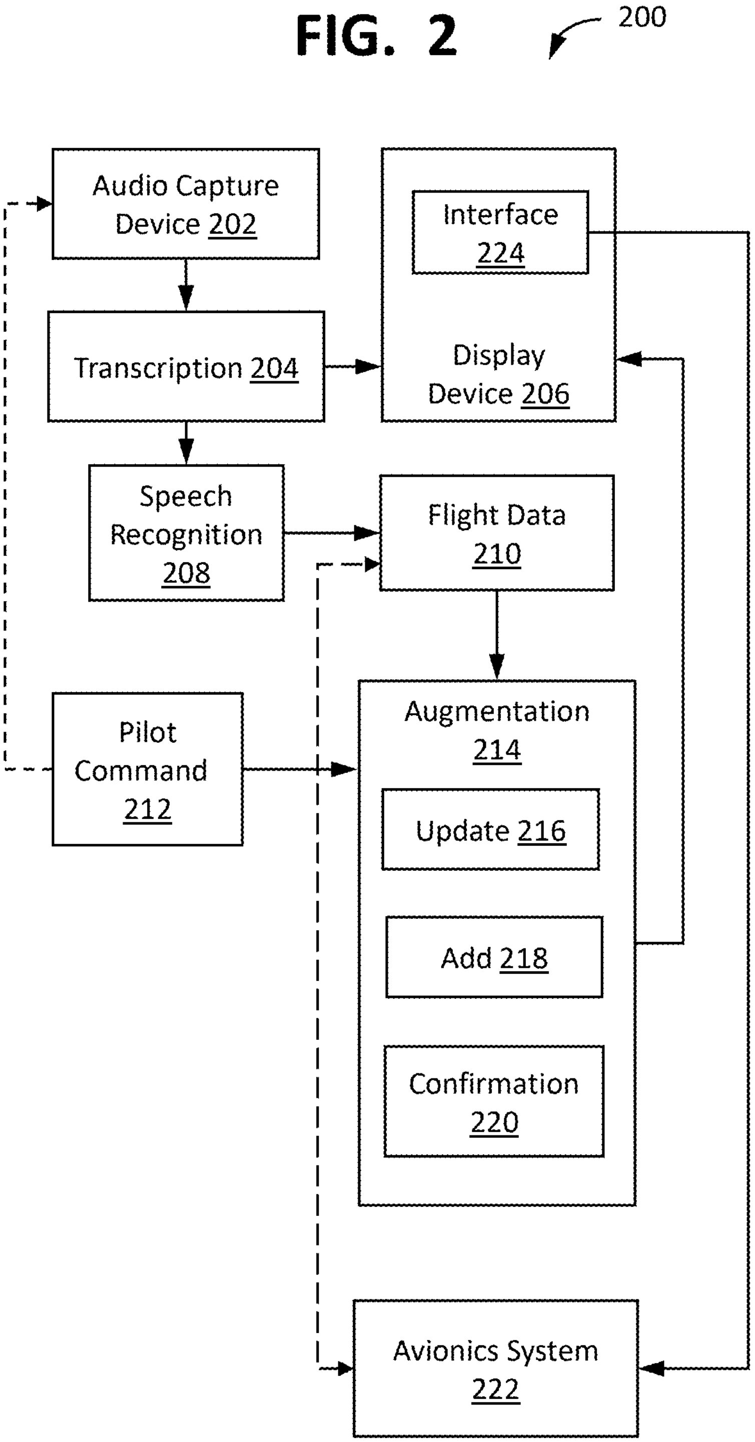
FIG. 2 is a schematic diagram of an example transcription page unit of FIG. 1 and according to at least one of the implementations herein.

Referring to FIG. 2, a transcription page unit 200, similar or the same as transcription page unit 122, determines or receives vehicle or flight-related parameters from a transcription, avionics systems, or such parameters that are to be input by a pilot, and provides parameter fields directly on a transcription page to receive parameter updates or original parameter entries from a pilot directly on the transcription page.

In one or more example implementations, the transcription page unit 200 may be implemented or otherwise provided entirely onboard a vehicle, such as an aircraft; however, in alternative implementations, the transcription page unit 200 may be at least partially implemented independent of any aircraft or vehicle, except for a display device on the vehicle that communicates remotely with other units of the transcription page unit 200 and shows the transcription page on the aircraft or vehicle. The example transcription page unit 200 here includes an audio capture device 202 (such as microphones 104 (FIG. 1)), a transcription unit 204, a display device 206 that may have interface 224 and display system 110, a speech recognition unit 208, a flight data unit 210, a pilot command unit 212, an augmentation unit 214, and one or more avionics systems 222, the same or similar to avionics systems 116, 118, and 120. The augmentation unit 214 may have an update unit 216, an add unit 218, and a confirmation unit 220. One or more of these units may be considered separate from the transcription page unit 200, where the transcription page unit 200 is alternatively formed of at least the transcription unit 204 and the augmentation unit 214, while the other units mentioned may operate independently.

The output of the transcription page unit 200 is coupled to one or more of the avionic systems 222 to provide a parameter that may be part of control signals or other indicia of a recognized control command or user input to the desired destination system 222 (e.g., via an avionics bus or other communications medium) for implementation, display, or manual or automatic execution of a flight plan as one example.

The transcription page unit 200 is operated by the processor 108. Specifically, the audio capture device 202 includes at least the microphones 104 and communications system(s) 112 (FIG. 1) to receive or otherwise obtain clearance and other types of communications, analyze the audio content of the communications, and provide audio signals to a transcription unit 204 in an expected format. Thus, by one form, the audio capture device 202 may include any sort of microphone, audio transducer, audio sensor, or the like capable of receiving voice or speech input. In one or more implementations, the audio capture device 202 may have the microphones 104 of user input device 102 onboard the aircraft to receive voice or speech annunciated by a pilot or other crewmember onboard the aircraft inside the cockpit of the aircraft.

The audio capture device 202 also may have the radio 114 of the communications system 112 to receive messages from various aircraft entities such as clearance messages from the ATC as one example. In some implementations, the messages from the radio 114 are emitted from speakers (not shown) in a cockpit while also being provided as datalink messages or similar formats, which are provided from the communications system directly to avionics systems that transcribe the messages for display to the pilot. This may include avionics systems that receive messages from automatic terminal information service (ATIS), controller pilot data link communications (CPDLC), and aircraft communications addressing and reporting system (ACARS) as some examples. The FMS unit 118 as well as other avionics systems 116 and 120 including applications on an EFB and others receive the datalink signals in an expected format that can be transcribed and/or decoded into text. Thus, the transcription unit 204 as well as the speech recognition unit 208 may be considered to be part of any one or more of these avionics systems.

The transcription unit 204 parses the audio signals into words or otherwise processes voice, speech, or other audio input received by the transcription page unit 200 to convert the received audio into a corresponding textual representation. The text is then provided to the display device 206, which may be the same or similar to display device 106. Such a transcription unit 204 may use machine learning, neural networks, and other algorithms to perform the transcribing, and may include much of the operations of the speech recognition unit 208.

As shown in this example, an (automatic) speech recognition (ASR) unit 208 may or may not be separate from the transcription unit 204, where the ASR unit 208 may perform much of the tasks of the transcription unit 204 but also adds language or semantic understanding to interpret and further process the audio messages. Thus, this may include having a speech recognition engine (or voice recognition engine) or other speech-to-text system that processes the received audio signals to perform tasks such as voice detection, feature extraction, acoustic modeling, decoding (by weighted finite state transducers that uses edges and nodes for example), and language recognition or modeling. Acoustic scores from the acoustic model compute probabilities for the different paths (or sequences of nodes and edges) of the decoder, with the highest probability path being recognized as the words, numbers, phrases and so forth forming the transcribed message. Many of these operations are shared by the transcription unit 204 such that the transcription unit 204 and speech recognition unit 208 may be a single unit or module to eliminate duplication of effort when the same algorithms, machine learning, and neural networks are being used for both tasks.

Accordingly, the transcription unit 204 and/or speech recognition unit 208 may share, or both include, various filters, analog-to-digital converters (ADCs), or other audio signal formatting operators. The data storage element 124 (or memory) may store speech recognition vocabularies for use by the transcription unit 204 and/or speech recognition unit 208 in converting audio inputs into transcribed textual representations 'comprehended' by the speech recognition unit 208. The output transcribed and recognized messages (in the form of a textual representation) then may be stored in the data storage element 124, and may be maintained in a certain order as received by the transcription unit 204, This includes both audio messages from the aircrew as well as the external messages. Also, the stored transcription message data may include the source of the transcribed message including the entity and radio frequency.

The output from the speech recognition unit 208 is provided to the flight data unit 210 to determine whether any flight-related parameters are provided with, or associated with, a transcribed message, and by one form, as well as to determine the full meaning of the transcribed message. In an example implementation here, the transcription page unit 200 continually transcribes audio content of communications received at the aircraft into corresponding textual representations, which, in turn, are then parsed and analyzed to identify the operational subjects and parameters specified within the received sequence of communications pertaining to the aircraft. For example, further natural language processing may be applied to the textual representations of the transcribed communications that were directed to the ownship aircraft by the ATC or another entity (or party), provided by the ownship aircraft to the ATC or another party, broadcasted by the ATC or another party, or otherwise received from the ATIS or another party to identify the operational subject(s) of the communications and any operational parameter value(s) and/or aircraft action(s) associated with the communications. This includes finding a parameter in the transcribed message itself or determining that the transcribed message includes an express or inherent request for a parameter from the pilot (e.g., the pilot has "discretion").

For each parameter, the flight data unit 210 may use natural language processing, machine learning, or neural networks (also referred to as artificial intelligence (AI)) techniques to perform further semantic analysis (e.g., parts of speech tagging, position tagging, and/or the like) on the transcribed message to identify the operational objective of the communication, the operational subject(s), operational parameter(s), and/or action(s) contained within the communication based on the syntax of the respective communication. Alternatively, this processing may be handled by the speech recognition unit 208 itself and provides the flight data with indications that certain language likely indicates certain types of flight-related parameters or parameter values.

Otherwise for example, the flight data unit 210 may use natural language processing or other semantic language models to extract or otherwise identify, if present, one or more of an identifier contained within the transcribed communication (e.g., a flight identifier, call sign, or the like), an operational subject of the communication (e.g., a runway, a taxiway, a waypoint, a heading, a speed, a thrust level, an altitude, a flight level, or the like), an operational parameter value associated with the operational subject in the transcribed communication (e.g., the runway identifier, taxiway identifier, waypoint identifier, heading angle, altitude value, or the like), and/or an action associated with the communication (e.g., landing, takeoff, pushback, hold, or the like). Also, the flight data unit 210 may analyze new communication entries relative to existing and previously stored communication entries to identify or otherwise determine a conversational context to be assigned to the new clearance communication entry when found to be relevant. The flight data unit 210 (or speech recognition unit 208) may recognize these flight-related commands, operational subject(s), operational parameter(s), and/or action(s) by using a flight command and/or parameter vocabulary to determine probabilities of a particular flight command, parameter, etc. to be implemented.

As a result of the automatic and semantic speech recognition, a parameter may be recognized that is mentioned in the transcription itself. Otherwise, the language of the transcribed message may indicate that a parameter is at the discretion of the pilot. In this case, the speech recognition vocabulary may be searching for the word discretion or similar words, such as choice, option, and so forth amid specific language for a specific type of parameter. As one example, "altitude is at your discretion" may be part of a transcribed message. In other cases, the request for the parameter from an external entity may be missing from an audio message received at the aircraft, and the flight data unit 210 may deduce which parameter is needed and provide the augmentation unit 214 a signal to display a parameter field on the transcription page to receive the parameter from the pilot or from an avionic system 118 or 120. This may occur when the ATC instructs the aircraft to fly at a heading direct to fix for example, where it is understood that the pilot may select the altitude, speed, etc. for manual or automated flight. Otherwise, whether a discretionary parameter is deduced and obtained from an avionics system may depend on what is usually performed for certain parameters under certain aircraft conditions. Thus, it may be known that a pilot usually selects an altitude by having the FMS compute the altitude under certain circumstances, and in others, the pilot is not expected to be able to compute a certain thrust level under certain situations and the avionics systems are directed to compute a value even though an ATC has stated the pilot has discretion.

Thus, a parameter already generated by one of the avionics systems 120 or the FMS 118 or generated by one of these systems in response to the transcribed message may be obtained in order to display with the transcribed message as well. In more detail, and in order to make these determinations and find parameters that are to be entered, updated, and confirmed by the pilot on the transcription page, the flight data unit 210 obtains information indicative of the current operational context and associated data (e.g., the current conversational context) of one or more onboard systems 116, 118, and 120 (e.g., the current geographic location, the current aircraft altitude, the current aircraft configuration, the current aircraft action, and/or the like) and automatically identifies one or more parameter values for the operational subject of the recognized transcribed message. Thus, the flight data unit 210 may attempt to identify parameter values for the operational subject of the transcribed messages and that could potentially be viable or feasible given the current state of the aircraft (e.g., the current geographic location, altitude, configuration, fuel remaining, etc.), or would otherwise be logical or consistent with the current operational context (e.g., consistent with the flight plan, preceding commands (such as ATC commands) or clearance communications for example, with respect to the aircraft, and/or the like).

By an additional approach, a relevant parameter is derived from analysis of the current conversational context and/or preceding transcribed communications maintained in the storage 124. In this regard, the flight data unit 210 may search or query the storage or a database holding the transcribed message data to identify one or more preceding communications, which may be ATC clearance communications, associated with the ownship aircraft (e.g., ATC commands or other instructions provided by the ATC to the ownship aircraft or ATC clearance communications provided by the pilot or other user to the ATC) that include the identified operational subject. Then, the specified parameter value is identified such as a parameter value that was already used or was at least already mentioned before for the identified operational subject in a preceding ATC clearance communication as a potential value. In this manner, the parameter that is selected as logically consistent with the current conversational context and preceding communications that may have been intended for entry by the pilot in connection with a transcribed message.

Similarly, in some implementations, the flight data unit 210 may determine or otherwise derive a potential parameter value by searching one or more databases or other data storage elements onboard the aircraft for potential parameter values for the operational subject that are likely to be relevant to the current operational context of the aircraft at the time of receipt of the respective voice command (e.g., the current flight phase, the current airspace or geographic region of operation, the current aircraft configuration, the current aircraft altitude, and/or the like). For example, based on the currently active flight plan, the current flight phase of the aircraft, the current aircraft procedure being flown, the current aircraft action, the current aircraft configuration, the current geographic location of the aircraft and/or the like, the flight data unit 210 may search an aircraft procedure database to identify a parameter value for an operational subject of a voice command that is consistent with the current flight phase, the current aircraft configuration and/or the like that is also associated with the current aircraft procedure being flown, an upcoming waypoint, procedure, route or airport associated with the currently active flight plan, or is otherwise within a threshold distance or altitude of the current geographic location of the aircraft, the current aircraft altitude, and/or the like.

It will be appreciated that there are numerous different manners in which a potential parameter value for the current operational context may be identified based on data stored or otherwise maintained in a database or other data storage element, and the subject matter described herein is not limited to any particular implementation. For example, if an audio message has a transcribed command that includes keywords that indicate a specific action or item from a checklist or a standard operating procedure, the flight data unit 210 may search, query, or otherwise reference that checklist or standard operating procedure that is invoked by the command to identify a potential parameter value from that respective checklist or standard operating procedure.

Any combination of these ways to obtain parameters can be performed for any single or group of transcribed messages. It will be understood that for one option, these units also may automatically provide multiple alternative parameter values related to a same single requested or displayed parameter for a transcribed message. This may occur when different avionic systems indicate different parameters.

Also for the parameters or parameter fields determined above, the flight data unit 210 may mark, tag, or otherwise associate the transcribed message with the determined parameter or parameter field to track the parameter associations as needed. The parameters also may be stored or otherwise maintained in association with the corresponding transcribed messages.

Once the parameters to be updated, added, and/or confirmed are determined for associated transcribed messages by the flight data unit 210, the augmentation unit 214 manages the augmentation of the transcription page to permit a pilot to augment the parameters directly on the transcription page. Whether performed automatically upon receipt of a parameter from the flight data unit 210 or upon a pilot selecting a transcription (or transcribed message) on the transcription page, the augmentation unit 214 causes the display device 206 to show a parameter field on the transcription page.

When an initial parameter is already determined by the flight data unit 210, the parameter is displayed in (or as) the parameter field with an indicator feature that indicates the parameter is modifiable by the pilot. Thus, for example, the feature indicator may be a box, block, or window around the parameter to be adjusted. Otherwise, the indicator feature to indicate the parameter is adjustable may be a color of the text, a symbol, or other distinct feature on the text of the parameter and described below with process 300. The parameter to be adjusted may be text within the transcribed message itself, or may otherwise have a visual association with one or more of the transcriptions on the transcription page to clearly show a functional association exists between the parameter and a corresponding or associated displayed transcription. The association may be the location of the parameter field itself being near the associated transcription on the transcription page and/or other associations described below with the process 300.

When the fight data unit 210 sends a signal or otherwise indicates to the augmentation unit 214 that a parameter is to be initially provided by the pilot (e.g., "pilot's discretion"), the augmentation unit 214 causes the display device 206 to show an empty parameter field, whether as an empty window, empty space above a line or between text, and so forth. Here too, an indicator feature as mentioned is used to show that the empty parameter field is to be filled in by the pilot, and may be the existence of the window around the space itself, or similar or other structures. Also as with the parameter fields that already have a parameter, an association is provided to indicate a functional association between an empty parameter field and the associated transcription on the transcription page.

In response to displaying the parameter fields, a pilot may select a parameter field to enter or update a parameter. The pilot then can enter a command, via pilot command unit 212, in a variety of ways to perform the entry of a parameter into an empty parameter field or updating a parameter already in the parameter field. Thus, this action is referred to as the pilot command and where the pilot command unit 212 represents operations that provide the pilot commands to the interface 224 directly, or first to the augmentation unit 214 and in turn the interface 224. The augmentation unit 214 may have an update unit 216 to receive and update a parameter already placed in a parameter field, and an add unit 218 to enter an original parameter in an empty parameter field. These units 216 and 218 provide the indicator features on the display device to indicate to a pilot where a parameter is adjustable or to be entered.

The interface 224 may be a graphical user interface of the display device 206 to receive pilot actions to activate a transcription on the transcription page, activate a specific parameter field, and receive parameter values to place in a parameter field. The pilot may enter parameter values or text by hardware or virtual keypad or keyboard, touchscreen keypad or keyboard, mouse and virtual keypad, and so forth forming at least part of the interface 224 to enter or update parameters directly on the transcription page.

As an alternative, the pilot also may update parameters or provide an original parameter for an empty parameter field by audio message via the audio capture device 202 for example. In this case, once the pilot activates a parameter field, the captured audio transcribed and received by the flight data unit 210 expects the updated or new parameter for the selected parameter field and searches the message for the parameter, and provides the parameter to the augmentation unit 214 to place in the corresponding parameter field on the display device 206. By one form, full analysis of the pilot audio message may be omitted since it is expected. By other forms, the pilot is instructed to state the parameter with certain words or phrases in the audio message, such as "[transcription number or timestamp] altitude equals 1200 feet".

A confirmation unit 220 provides a confirmation activator formed by symbology or other visual indicator on the display device 206 so that a user can activate the confirmation of a parameter value shown on the display device. By one form, the confirmation activator is only visible once a parameter value is placed on the parameter field. In an alternative, the confirmation activator is visible on the display device 206 whether or not the parameter value is there yet.

Once a pilot activates the confirmation activator for a parameter in a parameter field on the transcription page, the parameter is transmitted to the appropriate avionics system 120 (including FMS 118 or navigation system 116) for use, such as for automatically generating a flight plan by the avionic system 118/120 or displaying the flight plan on other displays.

In one or more example implementations, the parameters are also stored or otherwise maintained in association with the received audio messages, which, in turn, may be used adaptively to train (or retrain) and dynamically update transcription, automatic speech recognition, and flight data models, as described above. The details of operation of the transcription page unit 200 are provided below on process 300.

Figure 3A:
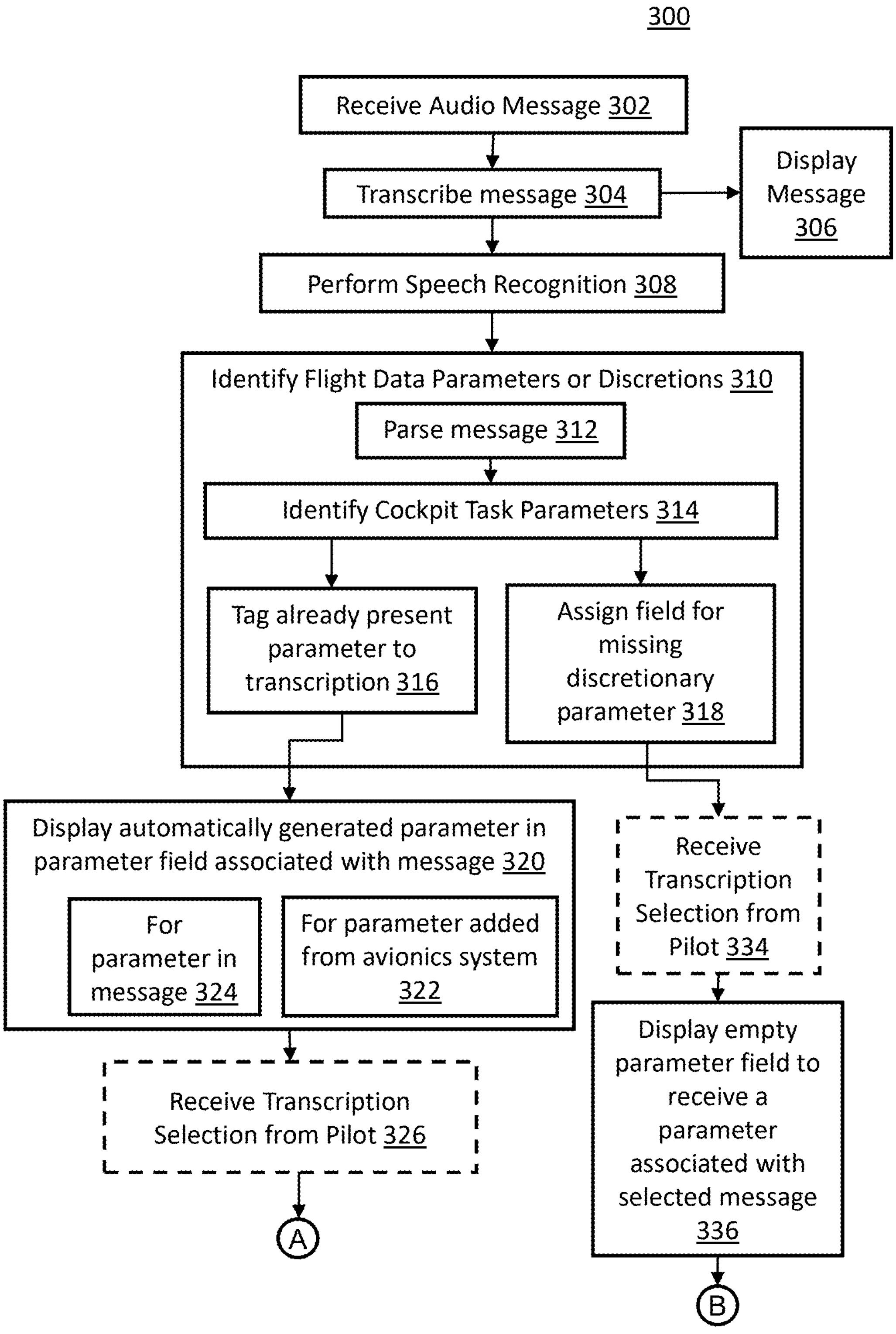
FIGS. 3A-3B is a flow chart of a method of augmenting transcribed audio messages according to at least one of the implementations herein.
Figure 3B:
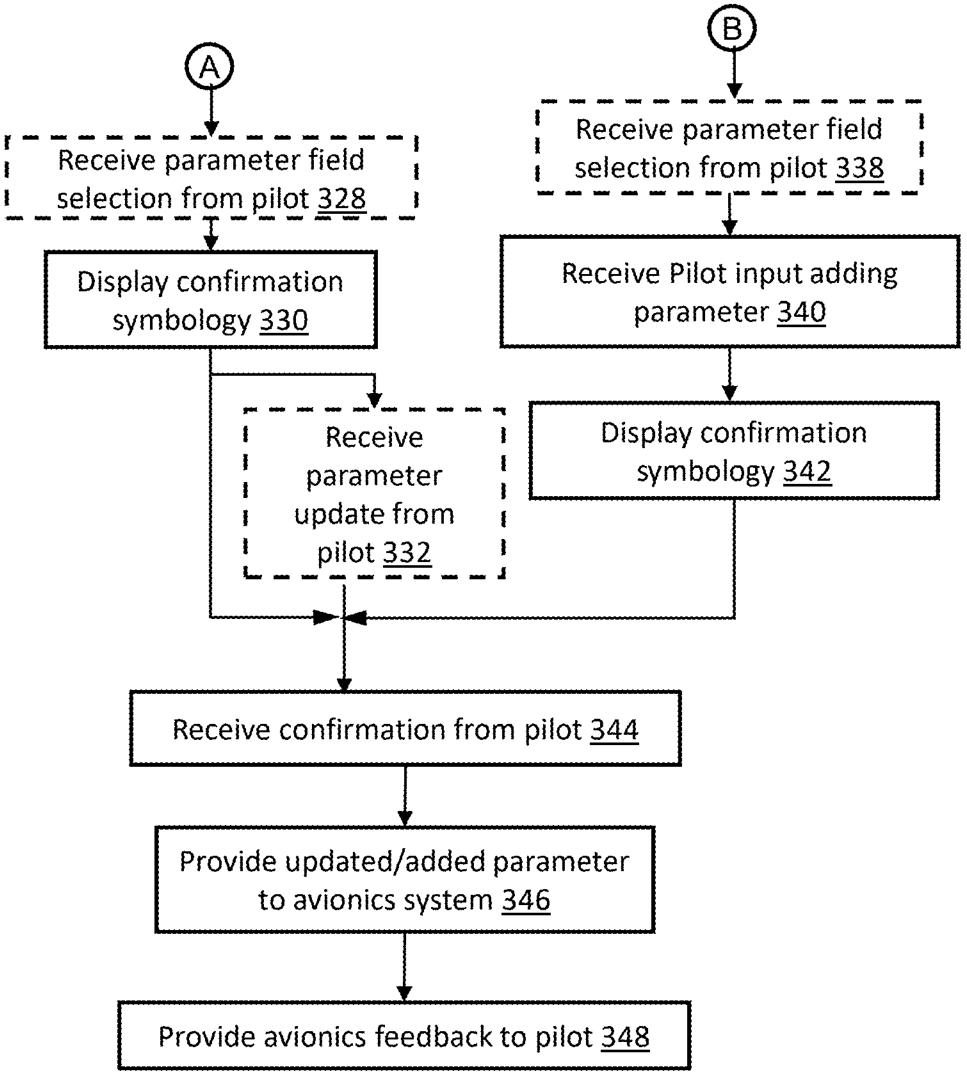

Referring to FIGS. 3A-3B, a process 300 for pilot augmentation of transcribed audio messages is described according to at least one of the implementations herein. The process 300 includes operations 302 to 348, generally numbered evenly. Systems, device, modules, units, and display pages of any of FIGS. 1-2 and 4-7 may be referred to for process 300 where relevant.

Process 300 may include "receive audio message" 302. For example, a pilot may tune a radio of a communications unit to receive audio messages from, or associated with, a certain entity, such as the ATC, ATIS, AOC, CPDLC, ACARS, Terminal Weather Information for Pilots (TWIP), and so forth. The messages from an ATC for example, may be clearance messages that indicate many different flight-related parameters to be used such as heading, altitude, speed, and so forth as mentioned above. Otherwise, the entity may inform the pilot that a parameter is at the discretion of the pilot, and where the word "discretion" or similar words may or may not be used when the pilot is expected to understand that a parameter is at pilot discretion (or in other words, an inherent request for a parameter). This is often provided by the ATC depending on a number of factors including traffic density, where less traffic density provides a pilot more freedom to choose their preferred parameter, such as altitude for example.

So for example, the aircraft may receive an audio message from an ATC: "AIRLINE ONE SEVEN EIGHT THREE TURN LEFT HEADING ONE ZERO ZERO TO INTERCEPT LOCALIZER", providing a heading parameter 100 to an aircraft call sign of AL1783.

Another audio message may provide the pilot with discretions such as:

"AIRLINE ONE SEVEN EIGHT THREE ALTITUDE YOUR DISCRETION CONTINUE ON THE TWO FIVE FIVE HEADING" indicates call sign AL1783, an altitude discretion is provided for the pilot, and to continue on a heading 255.

Yet another transcribed audio message includes:

"AIRLINE ONE SEVEN EIGHT THREE AH SPEED IS YOUR DISCRETION" indicates call sign AL1783, and a discretion as to the speed.

When the pilot conducts a conversation back and forth with the entity, the pilot's own audio messages are captured by microphones on the aircraft as well as explained above. The transcriptions mentioned above may be subsequent audio messages without the pilot responding between the messages. Otherwise, the pilot responses may not be shown to simplify the transcription page when desired.

Process 300 may include "transcribe message" 304, where each of the audio messages are transcribed. By one form, the messages from the entities are also provided by datalink and automatically pre-transcribed or transcribed upon receipt by the avionic systems or separate transcription unit. The pilot audio messages also may be transcribed by a separate transcription unit or one provided by the avionic systems, either or both of which may form the transcription unit 204.

Process 300 may include "display message" 306, which involves, by one example, displaying the transcriptions on a transcription page (TP) on a screen of a display device, such as a GUI, and specifically to display a sequence of transcriptions on a TP where the primary purpose of the TP is to display transcriptions of audio messages to avoid confusion with other configurations of data typically shown on other displays such as a primary flight display (PFD), horizontal situation indicator (HSI), vertical situation display (VSD), or any other vehicle or aircraft display that has a different primary purpose than showing transcriptions (or transcribed audio messages). Such display device showing the transcription page may be on the cockpit instrument panel or vehicle dashboard, or mounted within the cockpit, or may be on a mobile device that can be carried into a cockpit such as on an EFB.

Figure 4:
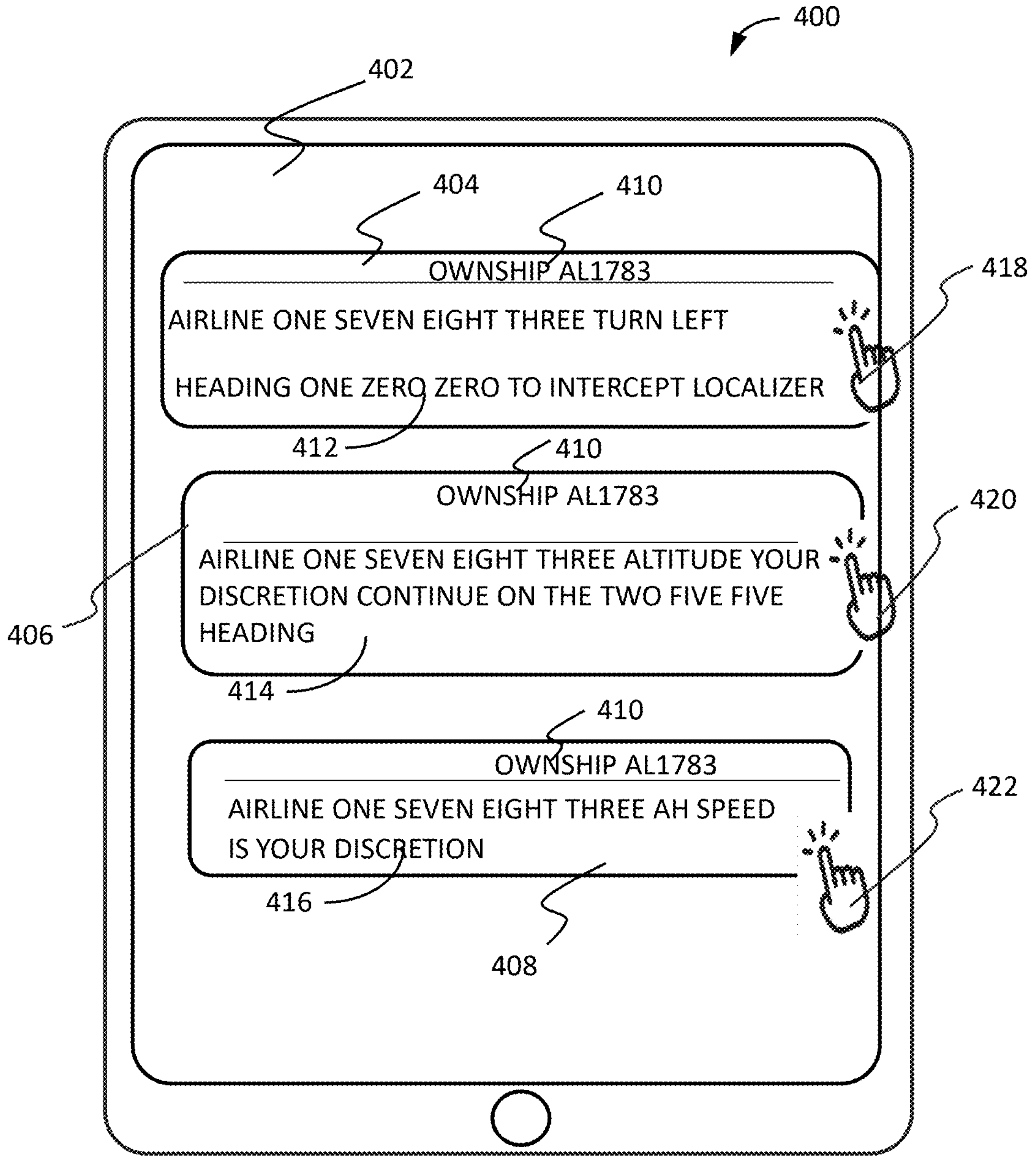
FIG. 4 is a schematic diagram of an example transcription page shown on a display device according to at least one of the implementations herein.

Referring to FIG. 4 as one example, a display device 400 shows a transcription page (TP) 402, which may be, or may be part of, an EFB that is a tablet with a touch screen in this example. The TP 402 shows transcription windows (or areas or borders) 404, 406, and 408 respectively for the transcribed messages (from above), here numbered 412, 414, and 416. Each transcription window 404, 406, and 408 also shows the call sign "AL1783". While not shown, each transcription 412, 414, and 416 also may show a transcription number, timestamp or other identifier of the transcription (not shown). The transcription page 402 may open upon a pilot activating a transcription app or program on, or associated with, the TP 402. The TP 402 may open by being activated on another avionic system screen, such as an FMS page for example. Otherwise alternatively, or in addition, the TP 402 may open automatically upon receiving an audio message by the radio and/or communications system, and may remain open for a certain interval of time when no messages are being received, as one example. Many variations exist.

Process 300 then may include "perform speech recognition" 308, and to recognize text forming the audio messages, and by using machine learning and/or algorithms as described above.

Process 300 may include "identify flight data parameters or discretions" 310, and where this includes the semantic or syntax-understanding level speech recognition that may be performed by the flight data unit 210. The transcription unit, speech recognition unit, and flight data unit may be combined into a single unit or any combination of these may be combined with less than three units when found to be efficient and effective.

Operation 310 here may include first "parse message" 312, and this refers to the initial operation of breaking down the messages into likely phrases and words for example that are related to flights and may be those matching phrases and words from a flight vocabulary used to classify the type of avionics data that can be involved in the audio messages.

Operation 310 then may include "identify cockpit task parameters" 314, where the parsed phrases and terms are identified as operational objectives of the communication or audio message, the operational subject(s), and/or action(s), as well as cockpit task parameters. Thus, in the examples above, the parameters directly in the transcribed messages may be identified such as heading '100' in message 412 and heading '25' in message 414.

As to the discretions, and as mentioned, the flight data unit determines which discretions, or which parameter types, are being requested from the context of the transcribed audio message. In the examples here, an altitude parameter is being expressly requested in transcription message 414, and a speed parameter is being requested in transcription message 416. As to transcription 412, it will be understood by the flight data unit 210 that a heading to an intercept localizer inherently gives a pilot the discretion to set an altitude and/or other parameters, so that an empty parameter field should be provided for this discretion to receive a pilot input parameter.

As mentioned above, automatically generated parameters may be determined by the flight data unit 210 for both the transcriptions that already included a parameter and transcriptions that indicate a pilot discretion as a parameter.

Thus, the flight data unit 210 may determine that avionics systems 116, 118, 120 already have a parameter, such as a parameter related to the current situation of the aircraft, such as a speed or altitude for example that does not necessarily need to be changed, even though the ATC is stating it is at the discretion for a pilot for a new leg in a flight plan. The automatically generated parameter may be computed while considering other factors not considered by the audio message, such as weather and/or air space clearance factors, for example. Many examples from many different types of the avionic systems can be used.

Such an automatically generated parameter may be obtained or computed by using data from a current flight plan (or current operational context and data) from the FMS such as with an already predicted or previously used parameter is determined as an economy-based (or cost-index based or fuel-efficient optimized) parameter, or an altitude clearance-based parameter for some examples. Otherwise, the parameter may be obtained from avionic databases on or off the aircraft, from a review of stored past transcriptions to find parameters already used or already mentioned, and/or from checklists or references of standard operating procedures, to name a few examples, and as a number of which are already described above.

Figure 6:
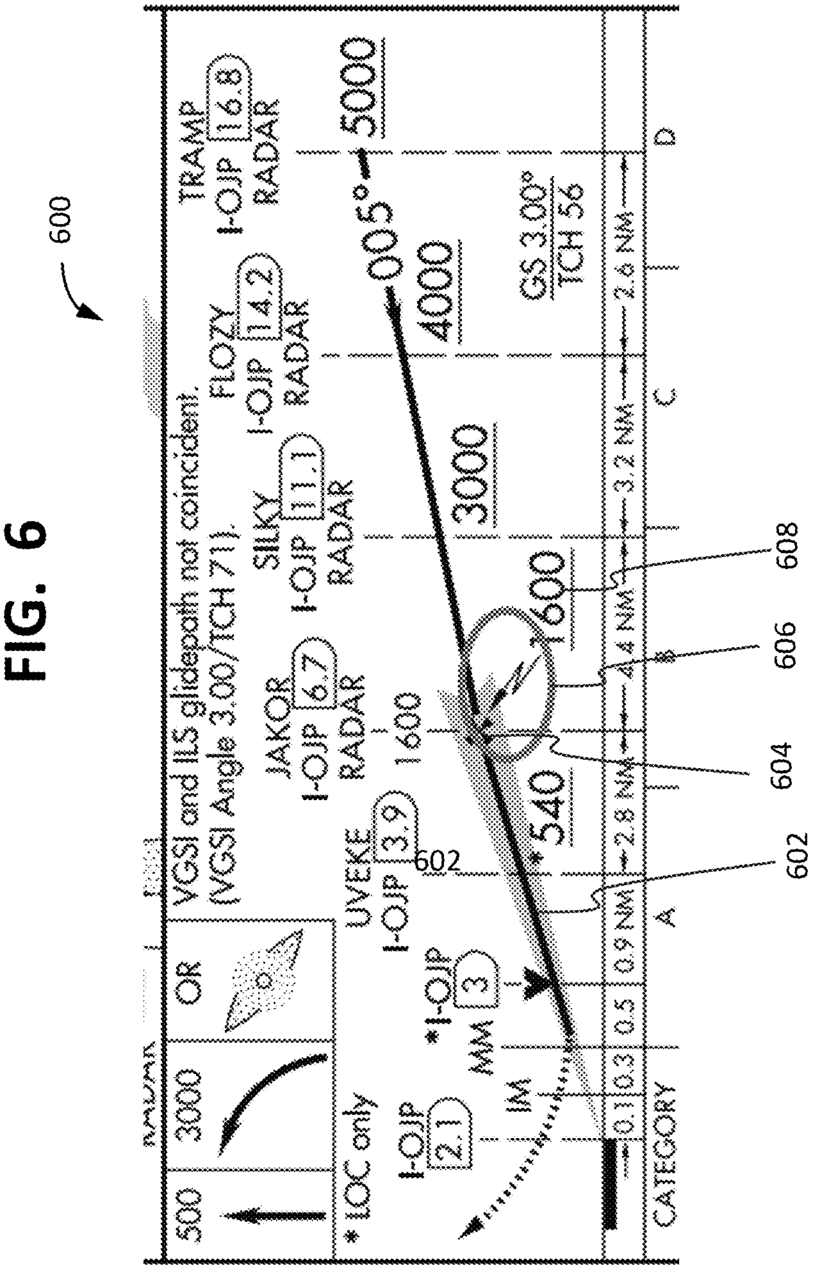
FIG. 6 is a schematic diagram of an example avionics chart showing a parameter to be provided to a transcription page according to at least one of the implementations herein.

Referring to FIG. 6 as another example, the parameter may be obtained from a display already being shown, or more particularly, from data used to show an avionic image on the display device. In one example, a digital E-chart 600 may be shown on a display device in a cockpit and here shows a vertical profile 602 with a waypoint or other location 604 that is to have a selected or computed intercept altitude parameter of "1600 feet" 608. The intercept altitude is marked by a lightening symbol 606. When the flight data unit 210 determines this 1600 foot altitude is relevant to a transcription, this altitude may be shown to the pilot on the transcription page 402.

By yet another alternative, a list of multiple, alternative, automatically generated parameters may be generated for a single transcription and displayed on the transcription page when desired.

The resulting generated, determined, or found parameter (or desired empty parameter field) may be classified as, or for, any of the operational parameters, subjects, and/or objects mentioned above.

When a parameter is already found in a transcription, or is automatically generated as mentioned, process 300 may include "tag already present parameter to transcription" 316. This includes creating a mark, tag, or otherwise associate the parameter, as being held in memory, with an association to the corresponding (or associated) transcription. This also may include creating and storing tables for such parameters that lists the parameter value and label or identifier of an associated transcription for each parameter to perform variable or data binding and context management for the transcriptions and parameters.

Process 300 may include "assign field for missing discretionary parameter" 318, and where a data (or a decision) to display an empty parameter field is effectively marked, tagged, or otherwise assigned to an associated transcription, as for transcription 412 as mentioned above. This may include associating a bit flag on a table or other location that indicates the parameter is yet to be obtained. This also may include planned formatting or arranging of the parameter field in anticipation of displaying the parameter field for an associated transcription on the transcription page 402.

Process 300 may include "display automatically generated parameter in parameter field associated with message" 320. In this case, the parameter field is shown on the transcription page 402 with a parameter in the parameter field. This can occur when (1) the parameter was provided in the audio message and is already on the transcription, or (2) the parameter was automatically computed or found by the flight data unit using the avionic systems and memories of the aircraft. In the second case, the parameter may be determined whether or not the discretion was given to the pilot.

Figure 5:
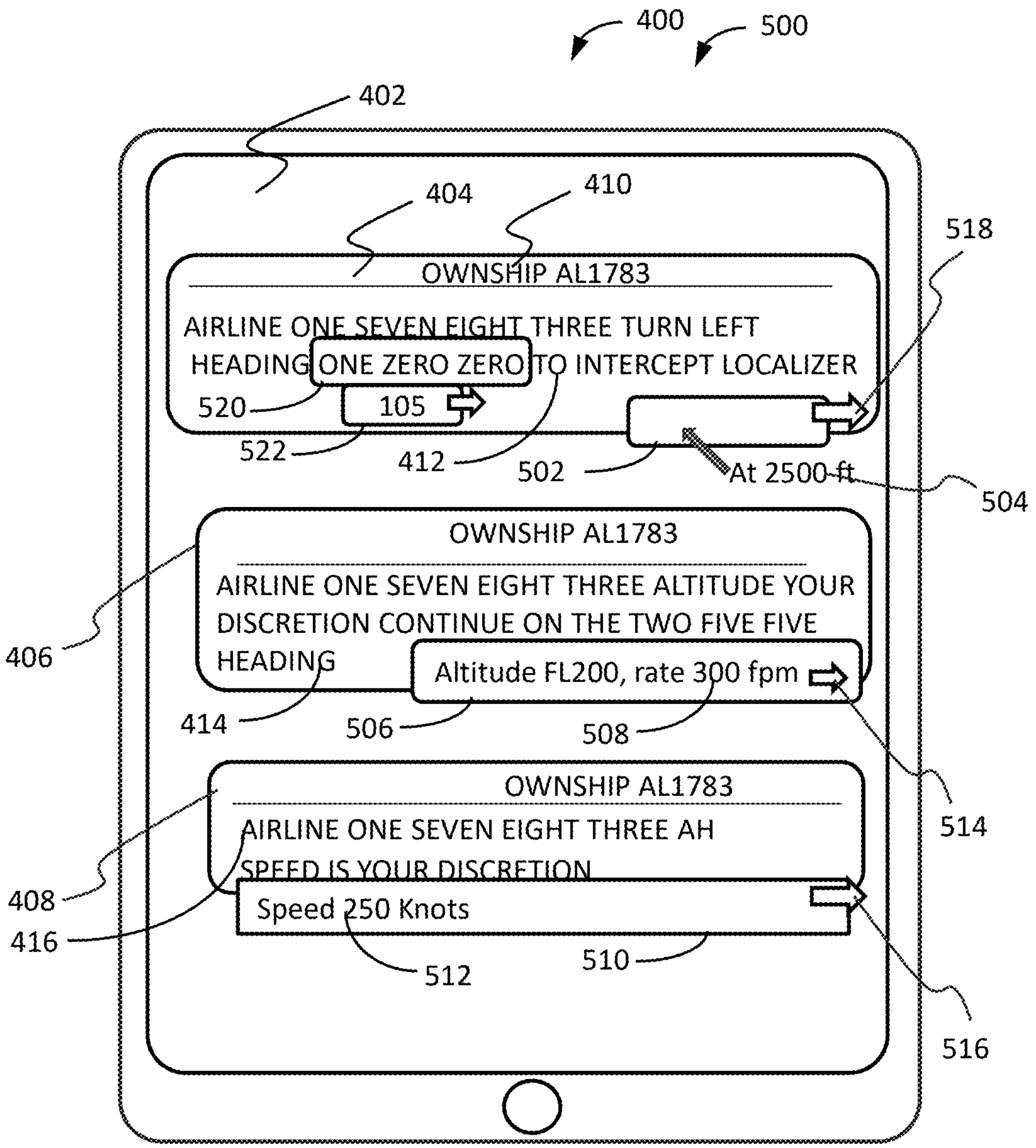
FIG. 5 is a schematic diagram of a subsequent version of the transcription page of FIG. 4 according to at least one of the implementations herein.

In the latter case, the operation 320 may include "for parameter added from avionics system" 322. Referring to FIG. 5 to continue the present example, a subsequent version 500 of the transcription page 402 on display device 400 is shown. Here, each of the transcriptions 412, 414, and 416 is shown with a respective parameter field 502, 506, and 510 as well as 522. In one random example, parameter field 506 shows a message with parameters 508, here being an altitude 'FL200' and rate '300' fpm, that may be automatically obtained by the flight data unit 210 using the avionic systems, even though the audio message (or transcription) 414 has a discretion for the pilot.

The parameter field 506 has an indicator feature to show that the parameters 508 can be modified directly in the parameter field 506. The indicator feature here is the parameter field 506 being in the form of a window, box, or block around the parameters 508. Alternatively or additionally, the indicator feature can be the color, font size or style, any other font-related distinction, highlighting at or around the parameters, another color pattern at the parameters, blinking or a light pattern of the parameters, and/or a symbol near a parameter, and so forth.

When the parameter field is not placed around text in the transcription itself, the parameter field has an association to the transcription to indicate the parameter field is associated with the transcription. This may be the position of the parameter field being next to, touching, or within a border of the transcription window 404, 406, or 408 as shown. Otherwise, a linking symbol or image may be used such as an arrow or line. Matching colors or patterns may be used, and/or an index on the transcription page with a table of the parameters on the transcription page may be used as well. Many other variations can be used as the association.

While a single parameter is shown for each type or class of parameter in the parameter field 506, it will be understood that multiple alternative parameters may be automatically generated and displayed in the parameter field 506. In this case, the pilot will be requested to select one of the alternates, such as by touching the alternate on the parameter field or typing in symbology, for example.

The operation 320 also may include "for parameter in message" 324. Thus, in this case, the parameter field may be placed at the location of the parameter in the transcription or may be provided as a separate field, albeit with an association to show the parameter field is associated with the transcription. For one random example, a heading 100 is recognized in the transcription, and the flight data unit 210 determines a better heading using the avionic systems, say due to current turbulent conditions that seems to be unknown to the ATC. In this case, a parameter field 520 is placed around the initial parameter to show it may be adjustable. Alternatively, another parameter field 522 may be placed next to the original parameter or parameter field 520 to display an alternative parameter, such as a heading. Of course, in this case, the pilot may be expected to get approval from the ATC for the adjusted heading. This can apply, however, to any of the types or classes of parameters that are being used.

Process 300 may include "receive transcription selection from pilot" 326, and this selection may be from a pilot touching a transcription window 404, 406, or 408 on transcription page 402 for example when on a touch screen as shown by hand symbols 418, 420, and/or 422, or by any other suitable way such as by moving a mouse on the transcription page and clicking on the desired transcription. Otherwise, the transcriptions may have numbers or labels (not shown) that can be typed into a physical keyboard or on a touchpad/touch virtual keyboard on a display, including the transcription page 402 such as with a pop-up keypad, and so forth. The selection of the transcription may occur before the parameter fields 502, 504, 506, and/or 520/522 are displayed, and may trigger the display of the parameter fields 502, 504, 506, and/or 520/522, or the parameter fields 502, 504, 506, and/or 520/522 may be automatically displayed when parameters, or the need for a parameter from the pilot, are first determined, and before selection of a transcription by the pilot.

Once a transcription is selected, process 300 may include "receive parameter field selection from pilot" 328, and in the same manner as mentioned for the selection of the transcription window 404, 406, and/or 408. Thus, the pilot need only touch the parameter field the pilot wishes to change in one example, and this may activate a parameter entry mode.

Process 300 may include "display confirmation symbology" 330, which here are images of arrows 514, 516, and 518. The pilot may confirm the displayed parameters 508 right away when the pilot agrees with the parameter values, and the parameters 508 may be provided to other avionics systems directly for use and display on other avionic displays, such as a PFD for example.

Process 300 optionally may include "receive parameter update from pilot" 332. In this case, the pilot is permitted to modify the parameters 508 before confirming them for example, and modified to different desired values during a parameter entry mode. This can be performed using the interface for the display device 400 as mentioned above including physical keyboards, virtual keypads or keyboards on a touch screen, or a mouse and a virtual keypad, and so forth to enter parameter values directly onto the parameter fields. This may show the replacement of the previous parameters in the parameter field character by character, or may simply erase the previous parameter when the pilot begins typing. Thus, as an example, the FL200 may be changed to FL190, and the rate 300 may be change to 250 of the parameters 508 and by the pilot.

By another approach, it will be understood that this updating can be performed with multiple alternative potential parameters displayed at a single parameter field as well. In this case, the pilot also selects which alternative parameter to use and/or update directly on the transcription page 402.

Otherwise, by another alternative, the pilot can trigger an audio mode, either by an audio mode activator placed in the cockpit, on the display device 400, or other location. By one example form, an audio mode may be entered by a long press or double click, on the parameter field to be changed and that can be considered equivalent to a push-to-command (PTC) button of voice activated avionics systems. Once activated, the pilot speaks an audio message received by the audio capture device 202, and eventually to the flight data unit 210 as described above. The now transcribed and recognized parameter spoken by the pilot is then placed into the selected parameter field to replace the previous parameter in that parameter field. Once placed, the pilot may confirm the selection by touching or swiping the confirmation activator on the transcription page for example, and to provide the confirmed parameter to the avionics systems as mentioned above.

Returning to the arrangement with empty parameter fields where the flight data unit did not compute or find an initial parameter value, process 300 may include "receive transcription selection from pilot" 334. Here, say that for the altitude discretion of the transcription 412, a pilot would like to enter an altitude of 2500 feet to intercept the localizer and is known by the pilot to maintain a smooth flight profile considering the current aircraft altitude. Thus, tagging the pilot planned altitude parameter value with the clearance transcription 412 will assist the pilot to execute the clearance smoothly. As another example, the selection of the transcription window 404 or transcription 412 may be received as well, and the pilot may wish to add a speed of 250 knots parameter (where the '250' is the parameter) 512 to the parameter field 502 as shown. The options for the action to select the transcription are as already described above with operation 326.

Process 300 may include "display empty parameter field to receive parameter associated with selected message" 336, and where the empty parameter field 502 has not received the parameter value or text yet. Thus, while the empty parameter field is shown as a window, block, or box, it may be shown as a completely empty (or blank that is the same color as a background color) space over or between text of the transcription 412, or an empty space over a line, or a highlighted space of a different color than a background color except with no text, and so forth. Otherwise, the empty parameter field may have non-parameter text or values that do not form the parameter itself. This may be instructions such as "Place Altitude Here", and so forth, and that can be customized depending on the type or class of parameter. Thus, the parameter field is still considered empty as long as it does not have the parameter characters, values, or text that form the parameter itself. Many variations are contemplated.

Process 300 may include "receive parameter field selection from pilot" 338 As mentioned above then, the pilot selects the parameter field of the selected transcription that the pilot wishes to change, as with operation 328. This activates a parameter entry mode of the selected parameter field.

Process 300 may include "receive pilot input adding parameter" 340, and similar or the same as updating a parameter described in operation 332, including options for touch screen, physical interfaces, mouse, or audio to enter a new parameter value in the parameter field, such as parameter field 502 or 510, in a parameter entry mode. As shown here, the pilot enters the input parameter 2500 (504 on FIG. 5) in the parameter phrase "At 2500 ft" as represented by the solid arrow.

Process 300 may include "display confirmation symbology" 342, where the confirmation operates as with operation 330. Note that as one further option, the pilot may be given the choice as to which avionic systems to provide the new or updated parameter, such as by buttons on the transcription page, that may pop open upon selection of the confirmation activator 514, 516, 518, or another avionics page.

Process 300 may include "receive confirmation from pilot" 344, and then "provide updated/added parameter to avionics systems" 346 so that the avionics systems can use the parameter, such as to generate a flight plan or add it to an already existing flight plan. The parameter then may be provided as a cue on other avionic cockpit system displays.

Figure 7:
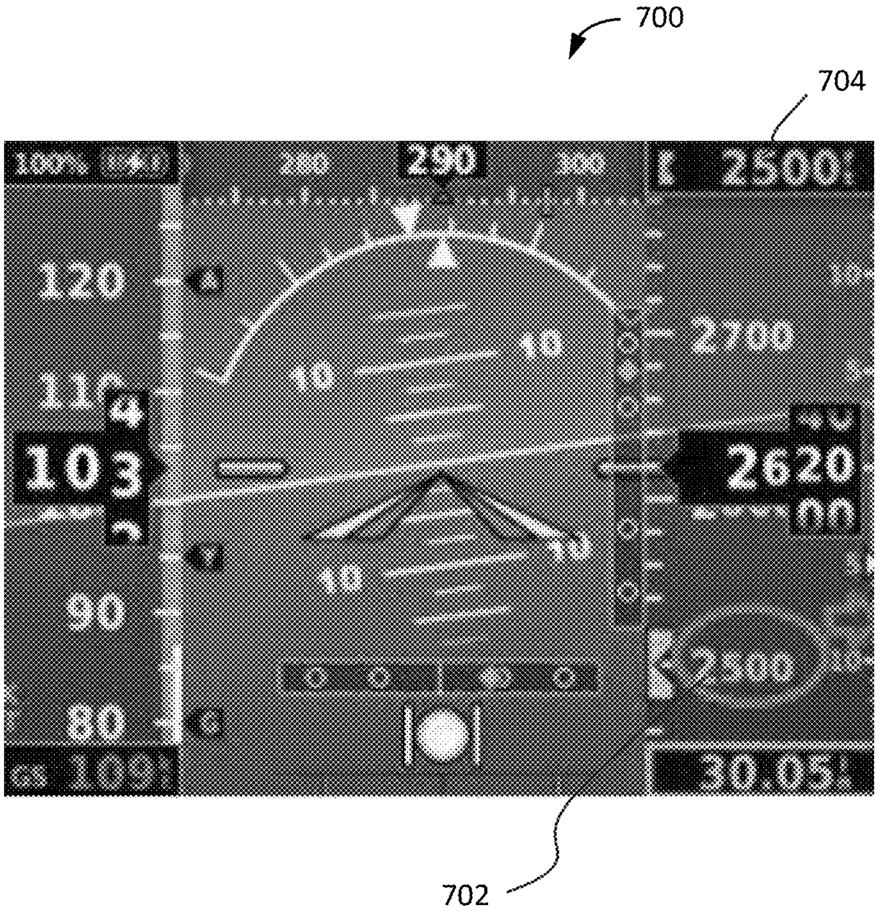
FIG. 7 is a schematic diagram of an example avionics display populated with a parameter from a transcription page according to at least one of the implementations herein.

Referring to FIG. 7 for example, process 300 may include "provide avionics feedback to pilot" 348, and this may include displaying the parameter on other displays, such as a PFD, HSD, VSD, E-chart, and so forth. By this example, a PFD 700 shows the pilot entered parameter (2500 ft) 702 as a cue on an altitude tape. The parameter 704 also is placed in a targeted (target value) altitude location on the PFD 700 as a reference altitude. Where a pilot sees the entered altitude 702 on the altitude tape, this visual cue may assist to help manage the descent rate with respect to the planned intercept altitude.

It should be appreciated that the process 300 may include any number of additional or alternative operations, and the operations need not be performed in the illustrated order. Also, the operations of process 300 may be performed concurrently, and/or may be incorporated into a more comprehensive procedure or process having additional functionality not described in detail herein. Moreover, one or more of the tasks shown and described in the context of FIGS. 3A-3B can be omitted from a practical implementation of the process 300 as long as the intended overall functionality remains intact.

For the sake of brevity, conventional techniques related to user interfaces, speech recognition, avionics systems, including determination of parameters associated with a transcribed message and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an implementation of the subject matter.

The subject matter may be described herein in terms of functional and/or logical block, module, or unit components, and with reference to symbolic representations of operations, processing tasks, and functions that may be performed by various computing components or devices. It should be appreciated that the various block components shown in the figures may be realized by any number of hardware components configured to perform the specified functions. For example, an implementation of a system or a component may employ various integrated circuit components, e.g., memory elements, digital signal processing elements, logic elements, look-up tables, or the like, which may perform a variety of functions under the control of one or more microprocessors or other control devices. Furthermore, implementations of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" refers to one element/node/feature is directly or indirectly joined to (or directly or indirectly communicates with) another element/node/feature, and not necessarily mechanically. Thus, although the drawings may depict one example arrangement of elements directly connected to one another, additional intervening elements, devices, features, or components may be present in an implementation of the depicted subject matter. In addition, certain terminology may also be used herein for the purpose of reference only, and thus are not intended to be limiting.

The foregoing detailed description is merely example in nature and is not intended to limit the subject matter of the application and uses thereof. Furthermore, there is no intention to be bound by any theory presented in the preceding background, brief summary, or the detailed description.

While at least one example implementation has been presented in the foregoing detailed description, it should be appreciated that a vast number of variations exist. It should also be appreciated that the example implementation or example implementations are only examples, and are not intended to limit the scope, applicability, or configuration of the subject matter in any way. Rather, the foregoing detailed description will provide those skilled in the art with a convenient road map for implementing an example implementation of the subject matter. It should be understood that various changes may be made in the function and arrangement of elements described in an example implementation without departing from the scope of the subject matter as set forth in the appended claims. Accordingly, details of the example implementations or other limitations described above should not be read into the claims absent a clear intention to the contrary.

What is claimed is:

1. A method, comprising:

receiving at least one audio message providing instructions to a user on an aircraft;

displaying, on a graphical user interface (GUI) of a display device on the aircraft, at least one transcription of the at least one audio message on a transcription page provided to display multiple transcriptions of multiple audio messages in a predetermined order;

displaying, by at least one processor, at least one parameter field on the transcription page and associated with the instructions, wherein the at least one parameter field has an indicator feature that indicates the at least one parameter field is modifiable by a user for the user to change or add a parameter value directly in the parameter field on the transcription page by manually selecting numbers or letters on a user interface to insert into the parameter field, wherein when a parameter value is to be added, the parameter field is either empty when opened to receive a parameter value from the user or provides an instruction indicating a type of parameter value, rather than a parameter value, that is to be manually entered into the parameter field by the user; and displaying, by at least one processor, an input parameter entered by the user using the graphical user interface to directly enter text or numbers in the parameter field on the transcription page on the transcription page and displayed on the parameter field.

2. The method of claim 1, comprising: receiving a user selection of a transcription on the transcription page; and displaying the at least one parameter field in response to the selection.

3. The method of claim 2, comprising displaying the at least one parameter field at a location on the transcription field that associates the at least one parameter field with one or more of the transcriptions.

4. The method of claim 1, comprising automatically populating the at least one parameter field with at least one parameter related to flight of the aircraft; and arranging the at least one parameter to be adjustable by the user as entry of the input parameter.

5. The method of claim 1, comprising providing the option for the user to confirm, on the transcription page, all three of:

an automatically generated parameter placed in the at least one parameter field, the input parameter that is a user provided parameter in at least one initially empty parameter field, wherein empty refers to a lack of a parameter value or text forming a parameter while being free to have other symbols or text in the parameter field and wherein the empty field is distinct from, and placed next to, a window displaying the transcription associated with the parameter value to be entered into the empty field, and the input parameter that is a user modified parameter modifying a parameter initially automatically generated by an avionics system and placed in the at least one parameter field.

6. The method of claim 1, wherein the indicator feature comprises at least one of:

the parameter field being a window around a parameter, at least one symbol near a parameter, and highlighting, color, font, or font-style of text forming a parameter.

7. The method of claim 1, comprising displaying the parameter field as an initially empty field displayed to a user and with no parameter value or text forming a parameter and wherein the empty field is distinct from, and placed next to, a window displaying the transcription associated with the parameter value to be entered into the empty field.

8. The method of claim 1, comprising receiving a selection by the user of the at least one parameter field to activate an entry mode of the at least one parameter field to enter the input parameter in the at least one parameter field.

9. The method of claim 8, comprising receiving the input parameter to enter into the parameter field by the user typing on a hardware keyboard or a virtual touch keyboard on the transcription display, a virtual touch keyboard or keypad on another display, and controlling a controller to move a cursor over a virtual keyboard on a display.

10. The method of claim 1, wherein after the user selects one of the transcriptions or the at least one parameter field, receiving an audio message from the user transcribed with the input parameter; and entering the input parameter into at least one empty parameter field.

11. The method of claim 1, wherein the at least one transcription with the at least one parameter field has an instruction informing the user a value of the input parameter to be placed in the parameter field is at the user's discretion, wherein the instruction relates to flight of the aircraft and states, within the parameter field "enter [parameter type] here".

12. An aircraft, comprising:

memory storing data related to flight of the aircraft; and processor circuitry forming at least one processor communicatively coupled to the memory, and wherein the processor is arranged to operate by:

receiving at least one audio message providing instructions to a user on the aircraft, displaying, on a graphical user interface of a display device on the aircraft, at least one transcription of the at least one audio message on a transcription page provided to display transcriptions of multiple audio messages in a predetermined order, and displaying at least one parameter field on the transcription page and associated with the instructions, wherein the at least one parameter field has an indicator feature that indicates the at least one parameter field is modifiable by a user directly on the transcription page for the user to change or add a parameter value directly in the parameter field on the transcription page by manually selecting numbers or letters on a user interface to insert into the parameter field, wherein when a parameter value is to be added, the parameter field is either empty when opened to receive a parameter value from the user or provides an instruction indicating a type of parameter value, rather than a parameter value, that is to be manually entered into the parameter field by the user; and displaying an input parameter entered by the user using the graphical user interface to directly enter text or numbers in the parameter field on the transcription page and displayed on the parameter field.

13. The aircraft of claim 12, wherein the at least one parameter field is a block disposed within, touching, or visibly linked to a border of a transcription on the transcription page.

14. The aircraft of claim 12, wherein the processor is to operate by:

automatically populating at least one parameter field with an initial parameter related to flight of the aircraft; and after the user selects one of the transcriptions or the at least one parameter field, entering a transcribed parameter received from an audio message of the user and into the at least one parameter field with the initial parameter to replace the initial parameter as the input parameter.

15. The aircraft of claim 12, wherein after the user enters the input parameter into the at least one parameter field, the processor is arranged to receive a confirmation signal that the user swiped the at least one parameter field; and upon receiving the confirmation signal, the processor is arranged to provide the input parameter to an avionics system to generate or modify a flight plan.

16. The aircraft of claim 12, wherein the processor is to operate by:

receiving a user selection of at least two transcriptions on the transcription page;

displaying one of the at least one parameter field at each of the two transcriptions in response to the selection;

receiving a selection of both of the two at least one parameter field from the user, wherein a first of the two parameter fields has a previously entered parameter, and a second of the two parameter fields is empty; and receiving, from the user, a modification of the parameter in the first parameter field, and receiving a parameter from the user to be placed in the second parameter field of the two parameter fields.

17. A non-transitory computer-readable medium having computer-executable instructions stored thereon that, when executed by a computing device, cause the computing device to operate by:

receiving at least one audio message providing instructions to a user on an aircraft;

displaying, on a graphical user interface of a display device on the aircraft, at least one transcription of the at least one audio message on a transcription page provided to display transcriptions of multiple audio messages in a predetermined order;

displaying at least one parameter field on the transcription page and associated with the instructions, wherein the at least one parameter field has an indicator feature that indicates the at least one parameter field is modifiable by a user for the user to change or add a parameter value directly in the parameter field on the transcription page by manually selecting numbers or letters on a user interface to insert into the parameter field, wherein when a parameter value is to be added, the parameter field is either empty when opened to receive a parameter value from the user or provides an instruction indicating a type of parameter value, rather than a parameter value, that is to be manually entered into the parameter field by the user; and displaying an input parameter entered by the user using the graphical user interface to directly enter text or numbers in the parameter field on the transcription page and displayed on the parameter field.

18. The medium of claim 17, wherein the at least one transcription is from at least one of: an air traffic control (ATC), Automatic Terminal Information Service (ATIS), Terminal Weather Information for Pilots (TWIP), and Airline Operational Control (AOC), and wherein the transcription display is a window, screen, or page that only displays the multiple transcriptions distinct from a primary flight display (PFD), horizontal situation display (HSD), and vertical situation display (VSD).

19. The medium of claim 17, wherein the display device is a mobile device that communicates wirelessly with at least one avionics system on the aircraft.

20. The medium of claim 17, wherein the parameter field receives a parameter related to the aircraft and is at least one of: altitude, vehicle speed, thrust level, climb rate, descent rate, heading, landing instruction, departure instruction, an aircraft location, waypoint location, distance, and time.

* * * * *